United States Patent [19]

Ohkita et al.

[11] Patent Number: 5,099,374
[45] Date of Patent: Mar. 24, 1992

[54] DISK DRIVE WITH IMPROVED STRUCTURE FOR FASTENING BEARING ASSEMBLY TO ROTOR AND HOUSING

[75] Inventors: Masao Ohkita; Makito Takikawa; Isao Asano, all of Furukawa, Japan

[73] Assignee: Alps Electric Co., Ltd., Tokyo, Japan

[21] Appl. No.: 678,789

[22] Filed: Apr. 1, 1991

Related U.S. Application Data

[62] Division of Ser. No. 490,111, Mar. 7, 1990.

[30] Foreign Application Priority Data

| | | | |
|---|---|---|---|
| Mar. 7, 1989 | [JP] | Japan | 1-25134[U] |
| Mar. 7, 1989 | [JP] | Japan | 1-25135[U] |
| Mar. 7, 1989 | [JP] | Japan | 1-25136[U] |
| Mar. 7, 1989 | [JP] | Japan | 1-25137[U] |
| Mar. 7, 1989 | [JP] | Japan | 1-25138[U] |
| Mar. 7, 1989 | [JP] | Japan | 1-25139[U] |
| Mar. 7, 1989 | [JP] | Japan | 1-25140[U] |
| Mar. 7, 1989 | [JP] | Japan | 1-52858 |

[51] Int. Cl.⁵ .................. G11B 5/55; G11B 21/08
[52] U.S. Cl. ................................................ 360/106
[58] Field of Search ........................ 360/106, 105

[56] References Cited

U.S. PATENT DOCUMENTS

| | | | |
|---|---|---|---|
| 4,331,991 | 5/1982 | Morehouse et al. | 360/106 |
| 4,430,679 | 2/1984 | Van de Bult | 360/106 |
| 4,716,483 | 12/1987 | Walsh | 360/106 |

Primary Examiner—Robert S. Tupper
Attorney, Agent, or Firm—Guy W. Shoup; David W. Heid

[57] ABSTRACT

A magnetic disk drive device for reading-out/writing-in information on/from a disk which comprises a yoke plate for rotatably supporting an actuator by a pair of bearings; a stopper for restricting the rotation range of said actuator; a solenoid bracket integrated in the yoke plate; a lock mechanism for locking said actuator at the innermost peripheral of the disk; a base plate in which a recess for securing the yoke plate; an air filter formed in V-shape to purifying air in said case; and a back-tension regulating piece in contact with a flexible print board.

2 Claims, 28 Drawing Sheets

DISK DRIVE WITH IMPROVED STRUCTURE FOR FASTENING BEARING ASSEMBLY TO ROTOR AND HOUSING

This application is a division of application Ser. No. 07/490,111, filed Mar. 7, 1990.

FIELD OF THE INVENTION

The present invention relates to a disk drive device effecting read/write of information on/from a disk by means of magnetic heads.

BACKGROUND OF THE INVENTION

There are known disk drive devices using hard type magnetic heads. A disk drive device of this kind consists principally of at least one magnetic disk, at least one magnetic head for recording/reproducing information on/from this magnetic disk, a spindle motor for driving the rotation of the magnetic disk, an actuator drive mechanism for moving (seeking) the magnetic head in the radial direction of the magnetic disk, an auto-retract mechanism for causing the magnetic head to seek the innermost periphery of the magnetic disk at shut-off, a base plate on which each of the previously-identified components are located, and a top cover covering this base plate.

However, according to such magnetic disk drive devices, since the actuator drive mechanism and the autoretract mechanism are secured to the base plate by means of screws, it is necessary to mount these parts so as not to contact the magnetic disk. Therefore the regulation of the function and the performance of these parts was effected after the mounting thereof on the base plate. Further, in an auto-retracting mechanism including a solenoid and a lock lever operated by the solenoid, there is disposed a coil spring for energizing the lock lever and since the coil spring should be mounted in an energized state, the mounting operation is laborious and a large space for setting the coil spring is required, which was an obstacle against compacting the device. Furthermore, in a damper mechanism of an actuator, a swing arm is in contact with a rigid stopper or an elastic stopper and the stopper condition is the same on the outer periphery side, and on the inner periphery side. In the case where the rigid stopper is used, it is possible to obtain a high positional precision both on the outer and on the inner periphery side, and in the case where the elastic stopper is used, it is possible to increase the performance of the damper mechanism. However, in the present state of techniques, the stopper condition is satisfied neither on the outer periphery side nor on the inner periphery side. Further, in the magnetic head control mechanism, in order to control the movement of the magnetic head, it was necessary to make the force applied to a plate-shaped coil uniform over the movement region of the plate-shaped coil and to make the speed of the magnetic head uniform over the movement region. In addition, in a construction where an air filter was incorporated in a mold case as shown in FIG. 44, since an air filter unit 202 mounted on the mold case is fixed to the corner on a base plate 201, in the arrangement for attaching the air filter to a conventional disk drive device as shown in FIG. 44, the number of parts was great and the number of mounting steps was also great. Furthermore, since the mold case had a certain thickness, the effective area of the air filter was reduced, which decreased the purifying action. There was also a concern that the fixing positions of this mold case could loosen and that inner parts could be damaged. In addition, since a rotor 20 is directly in contact with outer wheels of bearings 14, 15 in construction of the bearing portion of an actuator in a conventional disk drive device as shown in FIG. 45, the distance between the rotor 20 and the outer wheels of bearings 14, 15 was varied due to the thermal expansion of a rotor and that the pressure fluctuated, which impaired stable rotation of the actuator. In addition, since the rotor 20 slides on the outer wheels of the bearings 14, 15 when the rotor is mounted on the bearings 14, 15, there is concern that the rotor 20 might be damaged. Furthermore, since a conventional device has no back tension adjusting piece as shown in FIG. 46, a flexible print board 101 receives a force in the direction F and by elastic force expands so that since back tension takes place on the actuator, it is necessary to set that the back tension to the actuator at 0 when the magnetic head is at the central position of the movement thereof. However the requirement should be effected at the mounting because of errors, etc. of the parts. Although it is desirable that the back tension is 0 at loading, this regulation is difficult.

OBJECT OF THE INVENTION

The object of the present invention is to provide a disk drive device capable of solving the problems described above.

SUMMARY OF THE INVENTION

In order to achieve the above object, a disk drive device according to the present invention is characterized in that it comprises stoppers disposed so as to support rotably an actuator on a yoke plate by a pair of ball bearings, on which at least a head is mounted; and for restricting a domain of rotation of the actuator, a solenoid bracket attached to the yoke plate; a base plate in which a recess is formed to secure the yoke plate to a position corresponding to the yoke plate, an air filter formed in a V-shape and attached to the corner of the base plate to clean air in the case, a back tension adjusting piece for suppressing back tension of the flexible print board taken out from the side of said actuator in a folded manner. Therefore, since the actuator can be easily set in place without touching the disk when it is built in the magnetic disk drive device and each of the mechanisms constituting the actuator is unified, each of the mechanisms is adjusted and then is assembled as an actuator to set in a base plate so that assembly work is simple and compactness can be attained. Further, the disk area can be used effectively because stopping conditions of the outer peripheral side and inner peripheral side of said stopper are made different by means of simple construction. In addition, since a pin of ball bearings is unified, the work of assembling the rotor to the bearings and exchanging it therefrom is simple and the rotor is not damaged, and the positioning precision to the base plate is improved.

Besides, since the number of parts is reduced, the filter area can be enlarged and the falling apart of a filter receiving stage can be prevented. Further, the back tension can be made zero by provision of a FPC back tension adjusting piece and loading to the arm due to flexed force is suppressed to effect sure head positioning.

DETAILED DESCRIPTION

Figure 1:
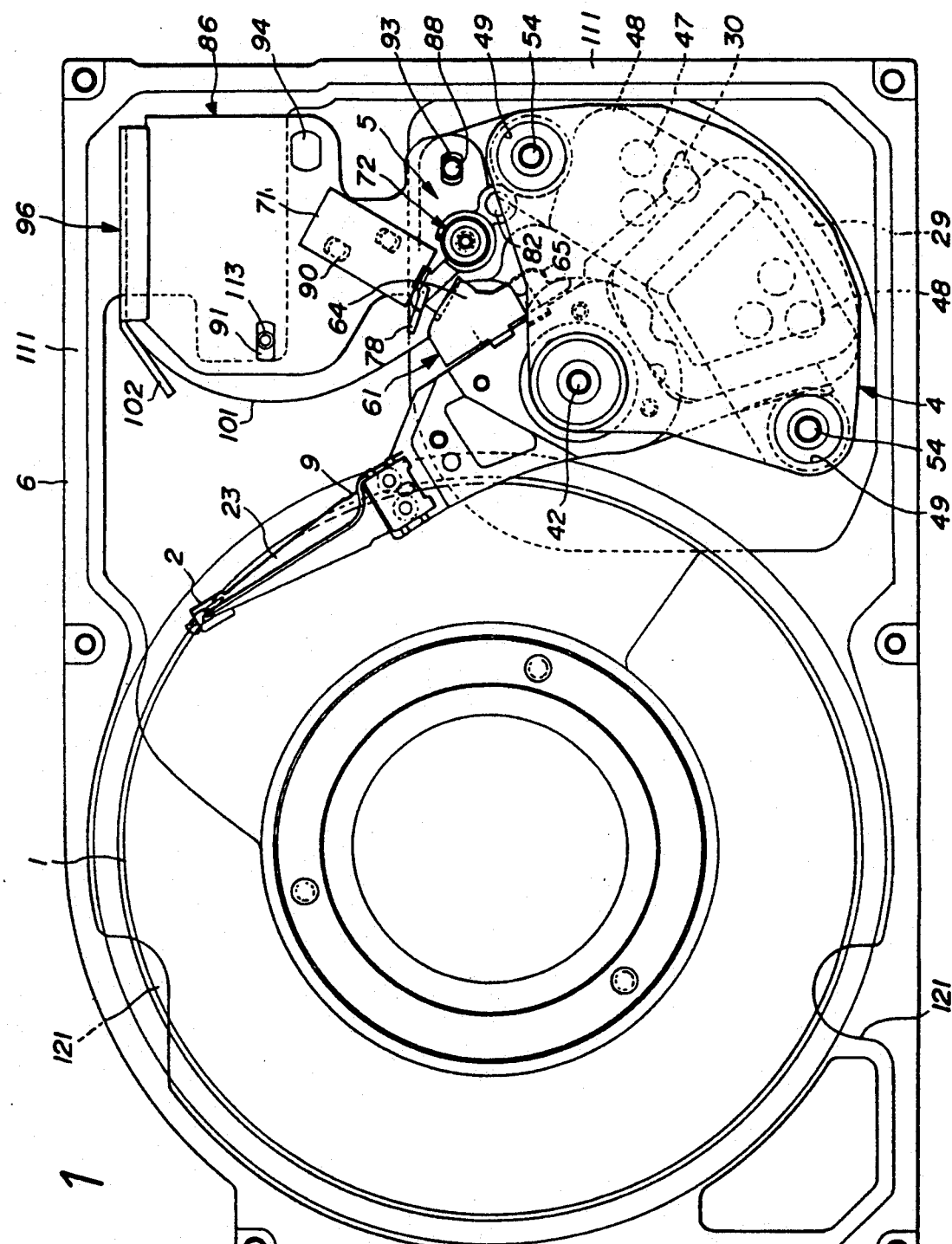
FIG. 1 is a plan view of a disk drive device according to the present invention, in the state where the top cover is removed.
Figure 2:
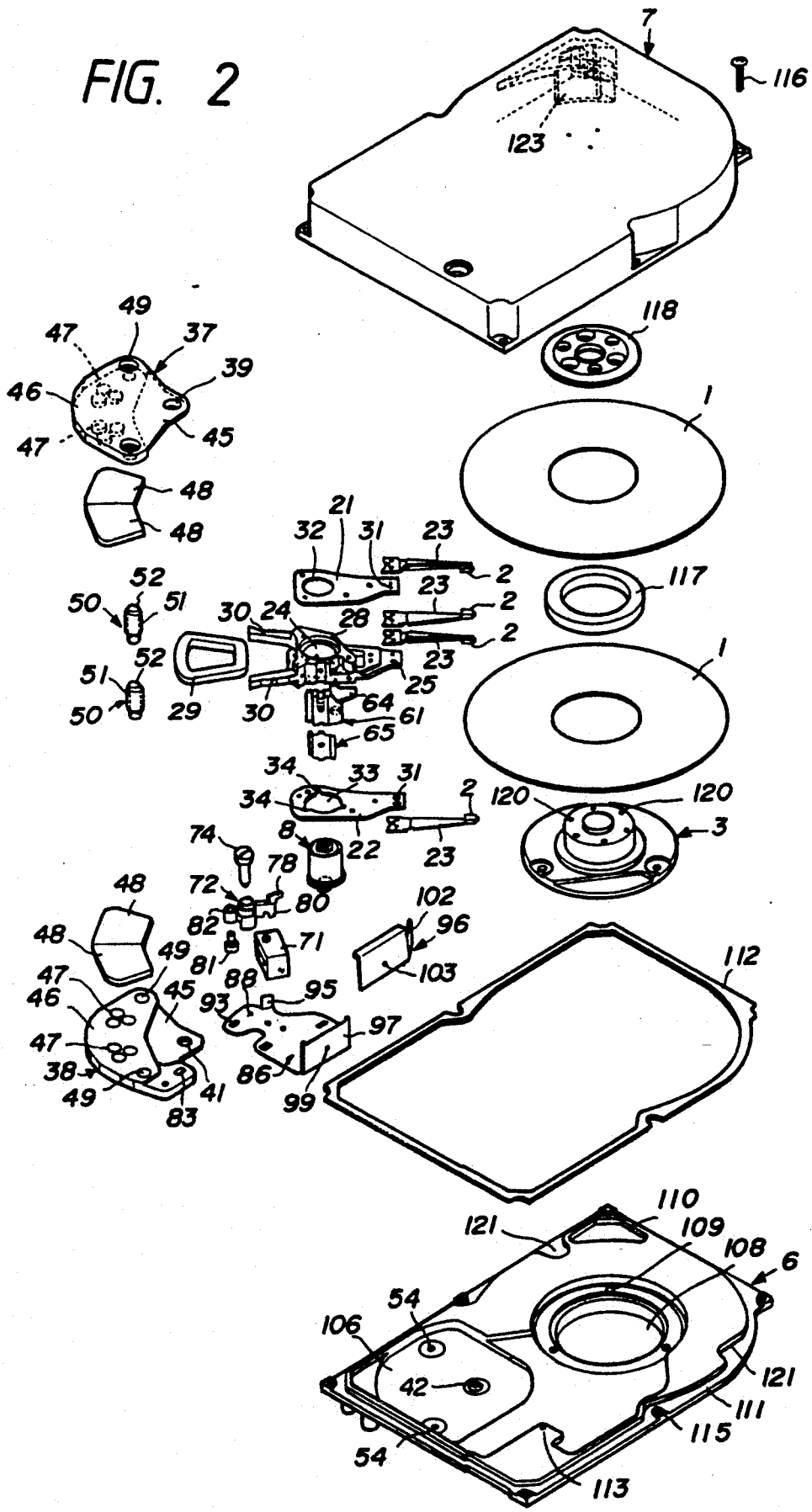
FIG. 2 is an exploded perspective view illustrating the whole construction of the disk drive device.

The disk drive device indicated in these drawings consists principally of at least a hard type magnetic disk 1, a magnetic head 2 recording/reproducing information on/from this magnetic disk 1, a spindle motor 3 for rotating the magnetic disk 1, an actuator drive mechanism 4 for moving (seeking) the magnetic head 2 in the radial direction of the magnetic disk 1, an auto-retract mechanism 5 for making the magnetic head 2 seek the innermost periphery of the magnetic disk 1 at shutdown, a base plate 6, on which they are located, and a top cover 7 covering this base plate 6 as shown in FIGS. 1 and 2.

Figure 5:
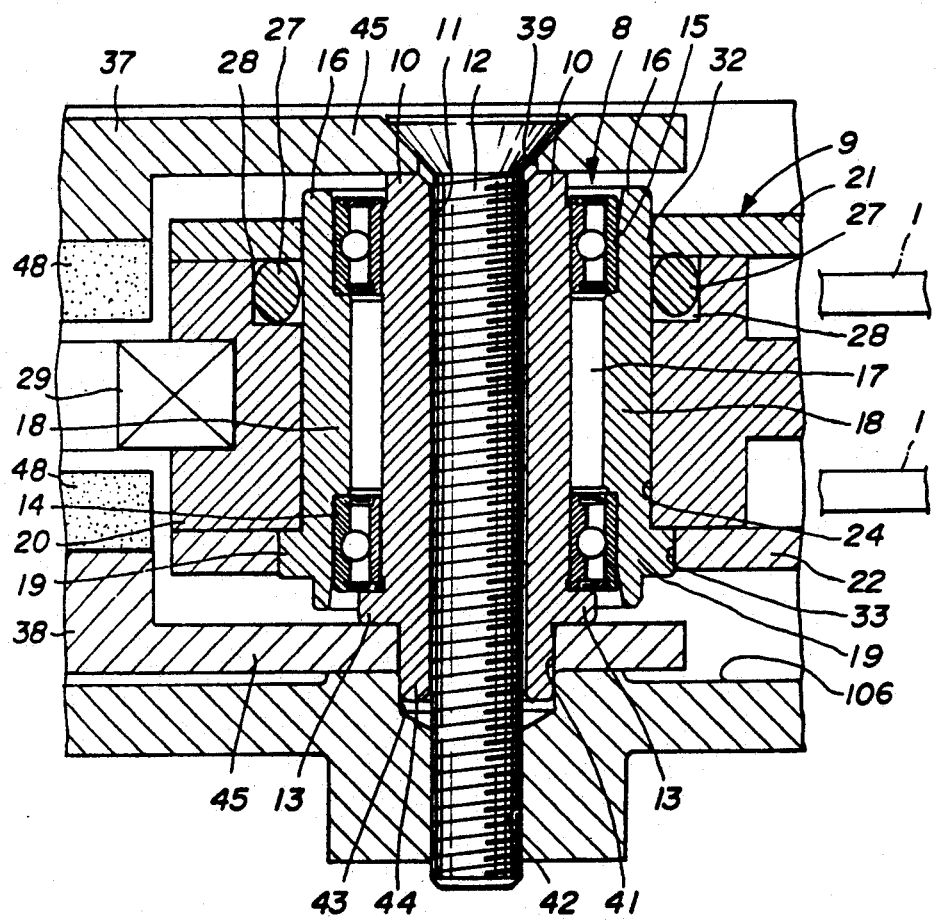
FIG. 5 is a longitudinal cross-sectional view of the bearing part of the actuator.

As indicated in FIG. 5, this actuator driving mechanism 4 has a pivot bearing portion 8. A swing arm 9 is supported rotatably by this pivot bearing portion 8 and a magnetic head 2 is mounted at the extremity of the swing arm 9 as shown in FIG. 1. Since this magnetic head 2 is rotated around the pivot bearing portion 8, the magnetic head 2 is moved on the surface of the magnetic disk 1 so that the recording/reproduction operation is effected on a predetermined track.

Figure 3:
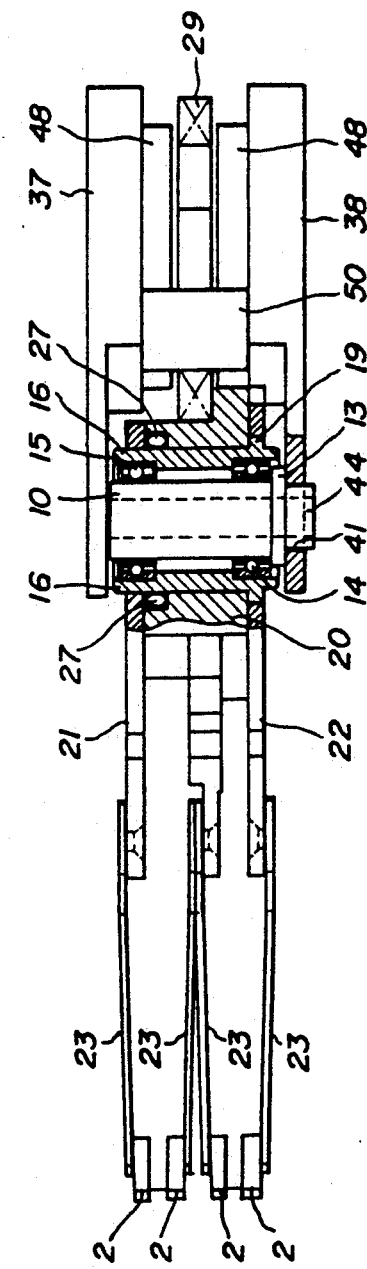
FIG. 3 is a side cross-sectional view of the actuator unit.

In the actuator drive mechanism 4 described above and thus constructed, referring to FIG. 5 there is disposed an outer wheel side holder 16, in which an engaging hole 17 is formed wherein the outer wheels of a pair of ball bearings 14 and 15 are engaged; a flange 19, for mounting the swing arm, formed on the outer peripheral surface of the outer wheel side holder 16; a rotor 20 constituting this swing arm engaged with the outer peripheral surface of the outer wheel side holder 16 so as to be in contact with the flange 19; an upper head arm 21 and a lower head arm 22 formed to be superposed on the rotor 20; furthermore referring to FIGS. 1 and 3, the swing arm 9 consists of: the rotor 20, the upper head arm 21 and the lower head arm 22 superposed on the upper and the lower surface of this rotor 20, respectively, an elastic gimbal plate 23 made of stainless steel and secured to the upper head arm 21 and the lower head arm 22 by means of screws and two gimbals plates 23 secured to the rotor 20 by means of screws. Magnetic heads 2 are mounted on the extremities of these gimbals plates 23. In the case of the present embodiment, the magnetic heads 2 are so disposed that two of them are opposite to each other on both the sides of each of two magnetic disks 1.

Figure 4:
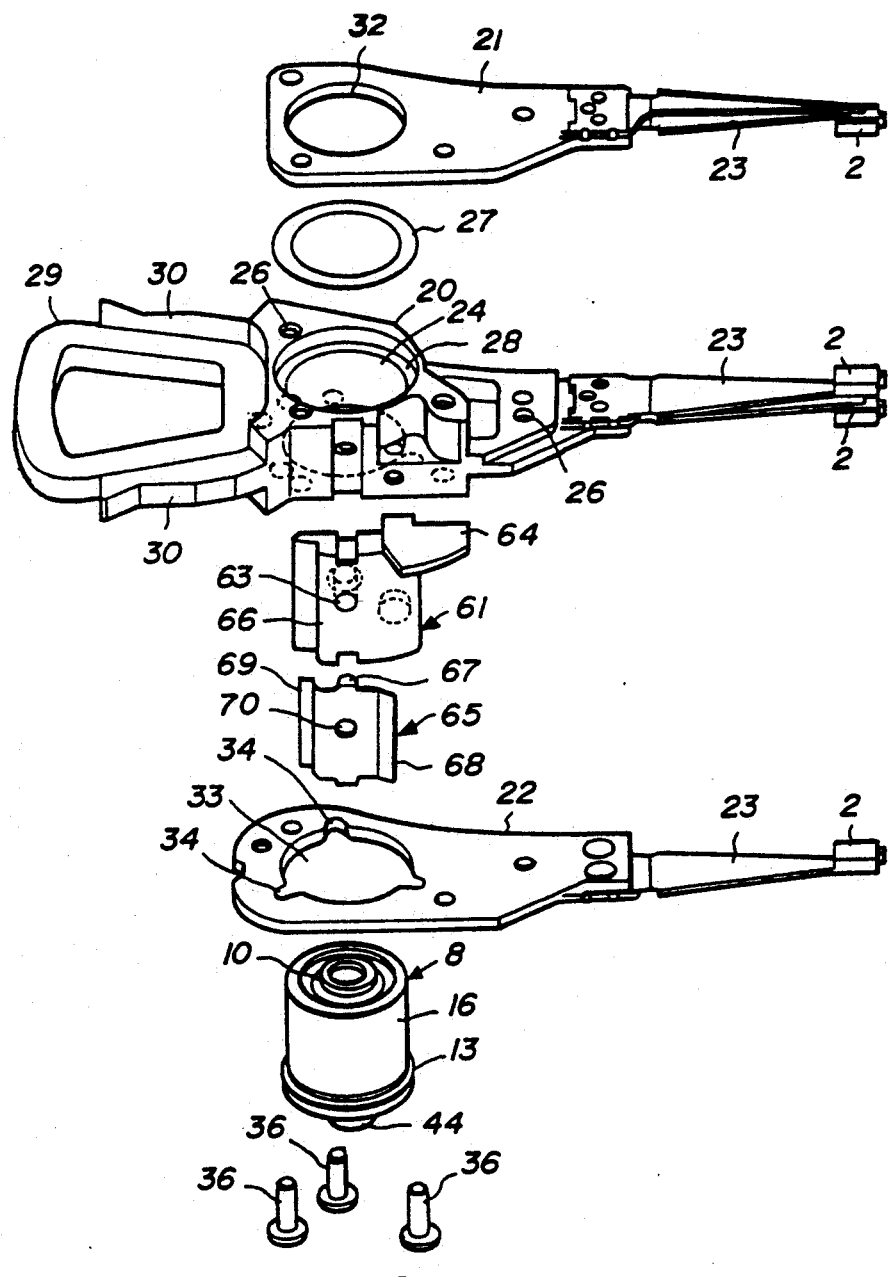
FIG. 4 is an exploded perspective view of the actuator part.
Figure 6:
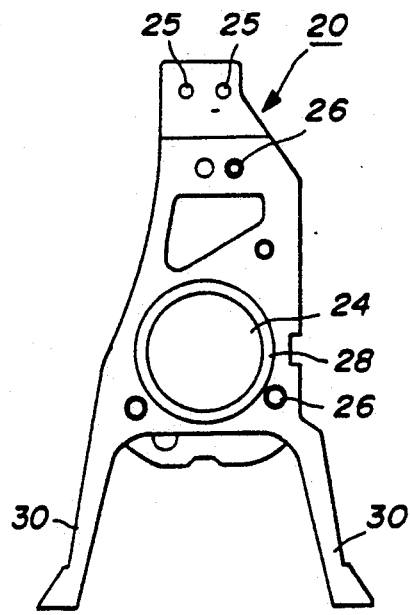
FIGS. 6 and 7 are a plan view and a bottom view, respectively, of the rotor of the actuator.
Figure 7:
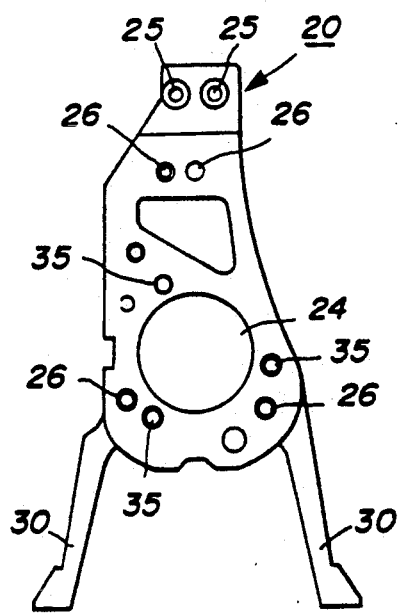

The rotor 20 is made of aluminum and a through hole 24 is formed in order that the pivot bearing portion 8 stated above is inserted therein as shown in FIGS. 6 and 7. Further threaded holes 25 for mounting the gimbals plates 23, 23 and threaded holes 26 for securing the upper head arm 21 and the lower head arm 22 thereto by means of screws are formed therein. A ring-shaped recess portion 28 for locating the O-ring 27 of FIG. 4 is formed around the through hole 24 at the proximity of the outer periphery thereof on the front surface of this rotor 20. From the outer periphery of the rotor 20 extend two supporting arms 30 for mounting a ring-shaped moving coil 29.

Figure 8:
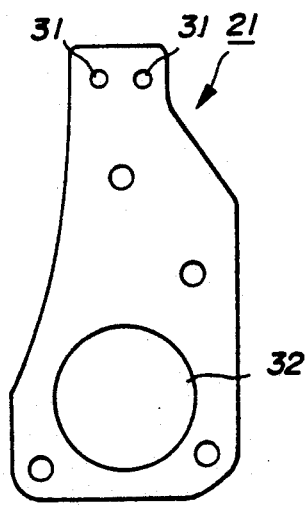
FIGS. 8 and 9 are plan views of an upper head arm and a lower head arm, respectively.
Figure 9:
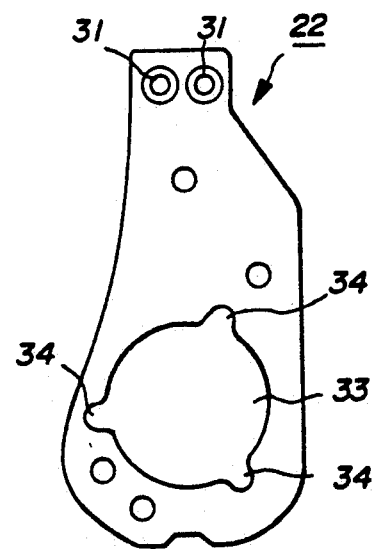

The upper head arm 21 and the lower head arm 22 are made of aluminum and as indicated in FIGS. 8 and 9, threaded holes 31 for mounting the elastic plate 23 are formed in each. Further through holes 32 and 33 for inserting the pivot bearing portion 8 therein are formed in head arms 21 and 22, respectively. The diameter of the through hole 33 formed in the lower head arm 22 is set so as to be greater than the outer diameter of the flange 19 of FIG. 5 for mounting the swing arm of the pivot bearing portion 8. Consequently, the flange 19 of FIG. 5 for mounting the swing arm can be inserted in the through hole 33 so that the upper surface of the flange 19 for mounting the swing arm is in contact with the lower surface of the rotor 20 as shown in FIG. 5. Furthermore, referring to FIG. 9, cut-out portions 34 are uniformly distributed on the periphery of the through hole 33 in the lower head arm 22 and corresponding to these cut-out portions 34 there are formed threaded holes 35 on the lower surface of the rotor 20 in FIG. 7. By screwing a screw 36 in each of the threaded holes 35 through each of the cut-out portions 34, the flange 19 for mounting the swing arm is secured by a half of the head portion of the screw 36 shown in FIG. 4 and the lower head arm 22 is secured by the other half of the head thereof to the lower surface of the rotor 20. On the other hand, the upper head arm 21 is disposed on the upper surface of the rotor 20 by means of screws. The O-ring 27 is held in the ring-shaped recess portion 28 formed in the rotor 20 by this head arm 21 as indicated in FIG. 5.

In this way, the ball bearings 14 and 15 are blocked together with the inner and the outer wheel holder 10 and 16 and thus the mounting precision of the ball bearings 14 and 15 is improved. Further, since the rotor 20 is fixed only on the flange 19 of the outer wheel side holder 16 by means of the screws 36, even if thermal expansion of the rotor 20 takes place, the rotor 20 is expanded and contracted along the outer peripheral surface of the outer wheel side holder 16 and the thermal expansion has no influences on the positional precision of the ball bearings 14 and 15 engaged with engaging holes 17 formed in the outer wheel side holder 16. Further, since the distance between the magnetic heads 2 mounted on the rotor 20 as well as the upper head arm 21 and the lower head arm 22 varies only slightly, even if the rotor 20 is elongated and contracted by the thermal expansion, and the position of each of the magnetic heads in the seeking direction remains unchanged, the thermal expansion has no influences on the recording-/reproducing operation on the magnetic disk 1 by means of the magnetic heads 2. Also, since the upper head arm 21 and the lower head arm 22 are disposed so as not to cover the upper and lower openings of the engaging hole 24 formed in the rotor 20, the ball bearings 14 and 15 can be separated farther by an amount corresponding to the thickness of the upper head arm 21 and the lower head arm 22 so as to increase the pitch and in this way it is possible to eliminate unintentional movement in the rotation of the actuator and to stabilize it. Since a pivot bearing portion 8 having the ball bearings 14 and 15 is secured to the rotor 20 by means of screws 36 together with the lower head arm 22, the mounting work is simple and replacement is easy. Still further, in the replacement of the rotor 20, the rotor can be simply mounted and dismounted without applying any undue force thereto and therefore the rotor 20 is damaged less. Furthermore, since the inner peripheral face of the O-ring is in contact with the outer wheel side holder 16 of the pivot bearing portion 8, the rotor 20 can be mounted without any play by using the O-ring 27 so that a stable movement of the actuator can be obtained. In addition, since an upper pole 37 is mounted by screws 12, which are flush head screws, the force in the horizontal direction on the upper pole 37 acts on the pivot bearing portion 8 in the axial direction through the tapered surface of the head portion of the flush head screws as that it is possible to prevent unintentional movement of the center of rotation of the pivot bearing portion. Furthermore, since the ball bearings 14 and 15 are firmly mounted at a predetermined position, it is possible to obtain a disk drive device rapidly supported against shock.

An upper yoke plate 37 and a lower yoke plate 38 as described after are disposed on the upper and the lower end of this pivot bearing portion 8, as indicated in FIGS. 3 and 5. The securing screw 12 stated above is inserted in a through hole 39 formed in this upper yoke plate 37. This securing screw 12 is inserted further through a through hole 11 formed in the inner wheel side holder 10 and a through hole 41 formed in the lower yoke plate 38 and screwed in a threaded hole 42 formed in the base plate 6, which is on the lower surface of the lower yoke plate 38 so that the pivot bearing portion 8 is secured to the base plate 6.

Figure 10:
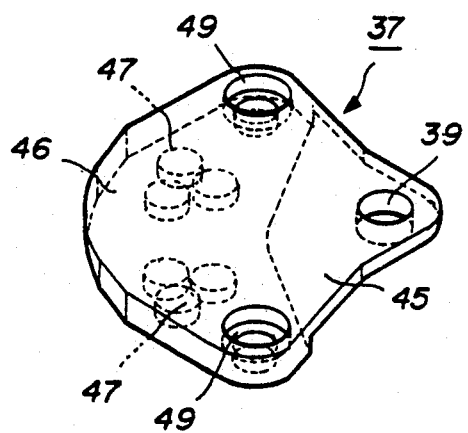
FIGS. 10 and 11 are perspective views of the upper yoke plate and the lower yoke plate, respectively.
Figure 11:
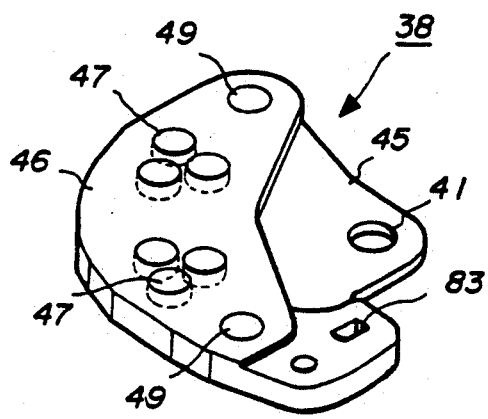
Figure 13:
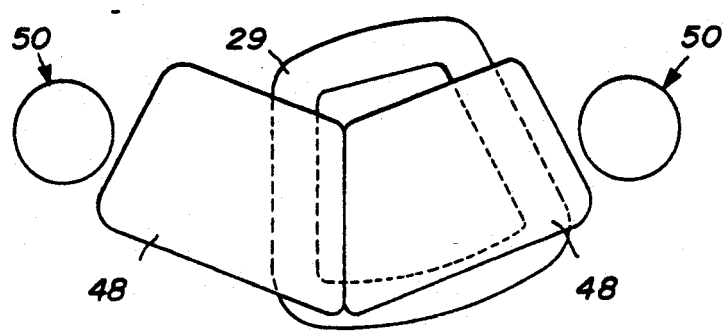
FIG. 13 is a plan view showing positional relation of a movable coil and the permanent magnet.
Figure 12:
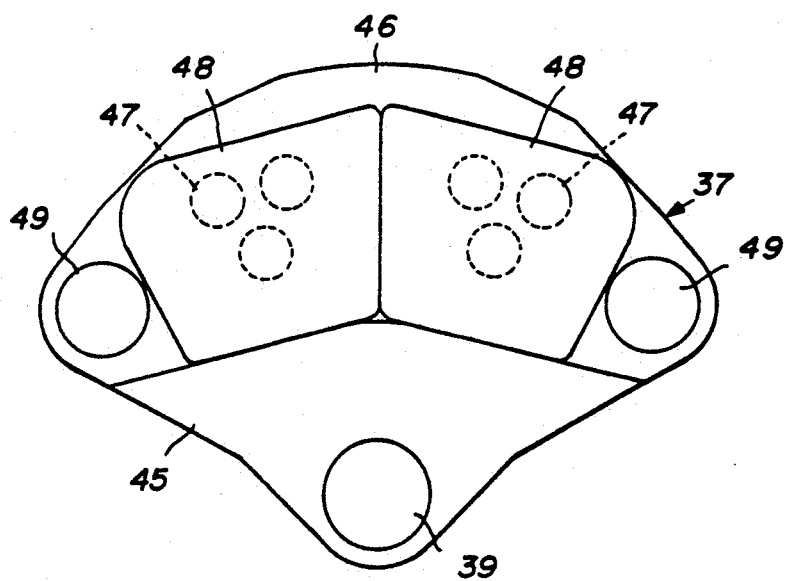
FIG. 12 is a plan view illustrating the state where a permanent magnet is secured to the yoke plate.
Figure 14:
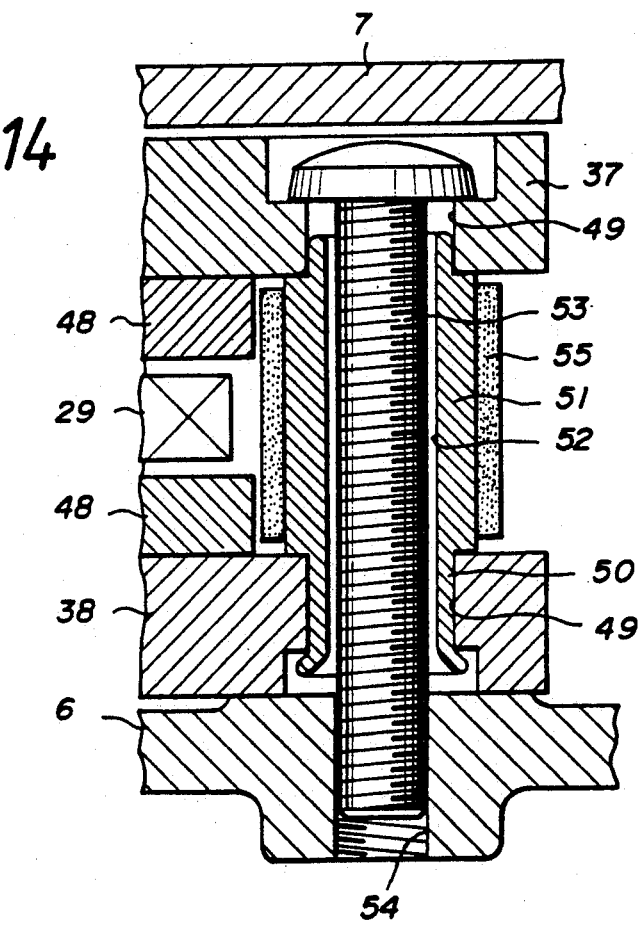
FIG. 14 is a longitudinal cross-sectional view of a fixed shaft part.

The upper yoke plate 37 and the lower yoke plate 38 are constructed by soft iron plates approximately pie-shaped as indicated in FIGS. 10 and 11, with thinner portions 45, in which the through holes 39 and 41, respectively, are formed. The arc-shaped sides of the upper yoke plate 37 and the lower yoke plate 38 have thicker portions 46, in which a plurality of recess portions 47 are formed in the lower surface of the upper yoke plate 37 and the upper surface of the lower yoke plate 38 which are opposite to each other towards the center plane. The plurality of recess portions 47 are formed at positions corresponding to the center of the region of movement of a moving coil 29 on the upper yoke plate 37 and the lower yoke plate 38 and at the same time a permanent magnet 48 is fixed by adhesion with epoxy so as to cover these recess portions 47 as shown in FIG. 13 and 14. In this way, since the recess portions 47 formed in the upper yoke plate 37 and the lower yoke plate 38 can be utilized as an adhesive pool, the contact between the permanent magnet 48 and the upper yoke plate 37 as well as the lower yoke plate 38 is improved and the strength of the adhesion is increased.

Since these recess portions 47 are disposed on the upper yoke plate 37 and the lower yoke plate 38, if differences in various conditions (design error or modification of variable angle, torque, linearity, etc.) are minimal, and since it is possible to combine the upper and lower yoke plates 37, 38 and the permanent magnet 48 by varying the conditions of formation of recess portions 47 in the upper yoke plate 37 and the lower yoke plate 38 while keeping the specification of the permanent magnet 48 constant, it is possible to standardize the form and the size of the permanent magnet 48 and to effect easily design modifications by varying the conditions of formation of the recess portions 47.

In this way, since it is possible to reduce magnetic force in the cylindrical recesses 47 at position corresponding to the permanent magnet 48, by increasing the size of the recess portions 47 on the upper yoke plate 37 and the lower yoke plate 38. The magnetic flux density can be made approximately uniform in the region of movement of the moving coil 29 on the permanent magnet 48 as shown in FIG. 3. In this way, the force acting on the moving coil 29 can be made approximately uniform in the region of movement of the moving coil 29.

Although the recess portions 47 are formed in the form of circles in the present embodiment, the present invention is not restricted thereto. For example, the recess portions 47 may have various forms such as rectangles, etc. Furthermore, there may be disposed one or a plurality of recess portions 47 and the depth of the recess portions 47 may be uniform or different. In addition, the recess portions may be parallel holes or tapered holes.

Since the fixed shaft 50 for fixing the upper and lower yoke plates 37, 38 is so formed that the outer diameter of the two end portions are smaller than the central portion, as indicated in FIG. 14, the distance between the upper yoke plate 37 and the lower yoke plate 38 is determined by the upper and lower ends of the large diameter portion 51. The lower end portion of the fixed shaft 50 inserted in the mounting hole 49 formed in the lower yoke plate 38 is fixed by splaying the bottom end outside as indicated in FIG. 14. In the insertion hole 52 formed in this fixed shaft 50, a screw 53 having a diameter, which is somewhat smaller than the inner diameter of the insertion hole 52, is inserted and the screw 53 is screwed in a threaded hole formed in the base plate 6 under the lower yoke plate 38. A cylindrical stopper 55 made of rubber, etc. is mounted on the large diameter portion 51 of this fixed shaft 50 and the outer ends of the supporting arms 30 of the rotor 20 are made in contact with this stopper 55 so that the domain of rotation of the rotor (actuator) is restricted.

Figure 15:
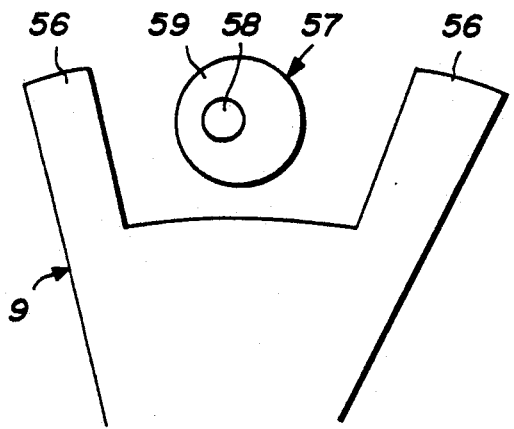
FIGS. 15 and 16 are plan views illustrating modifications of the stopper mechanism of the actuator, respectively.
Figure 16:
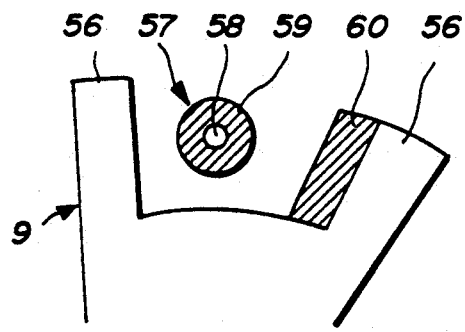
Figure 17:
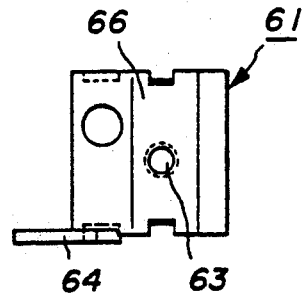
FIGS. 17 to 20 are a plan view, a front view, a bottom view and a cross-sectional view along a line A—A of a cable holder, respectively.
Figure 18:
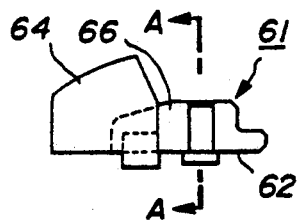
Figure 19:
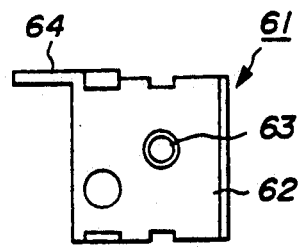
Figure 20:
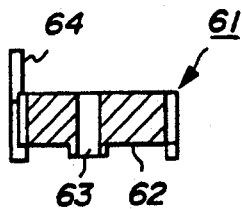

FIGS. 15 and 16 show different variations of the stopper. In FIG. 15, a pair of restricting pieces 56 are extended from the swing arm 9 and a stopping body 57 is disposed between these restricting pieces 56. This stopping body 57 includes a small shaft 58 standing on the lower yoke plate 38 or on the base plate 6 and an elastic member 59 having a circular or approximately elliptic cross-section, in which the small shaft 58 is inserted. The small shaft 58 is inserted in this elastic member, deviated from the center thereof. Consequently, the thicknesses of the parts of the elastic member 59, which are in contact in the two restricting pieces 56, 56 are different and thus it is possible to vary the condition at the collision of the arm for the inner periphery side and for the outer periphery side of the disk. Since the thickness is set smaller for the outer periphery side than for the inner periphery side, the positional precision and the damper function is obtained on the outer periphery side and the damper function is obtained on the inner periphery side. Therefore the magnetic disk area can be utilized with high efficiency. Further, since the outer peripheral side is made thinner than the inner peripheral side, positional precision and damper function in the outer peripheral side and damper function in the inner peripheral side can be obtained so that the magnetic disk area can be efficiently utilized. Further, in this case, the rotor 20 is not in contact with the fixed shaft 50, as described previously.

The difference in the device indicated in FIG. 16 from that indicated in FIG. 15 consists in that the small shaft is disposed at the center of the elastic member 59 and that an elastic member 60 is disposed fixedly on the restricting piece 56 corresponding to the inner periphery side. This disposition has the same effect as that described in the preceding embodiment.

Figure 21:
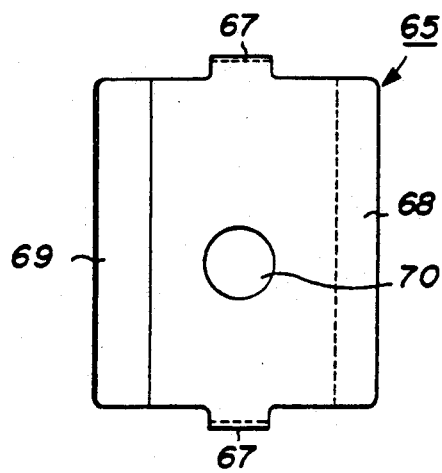
FIGS. 21 and 22 are a front view and a bottom view of a cable cramp, respectively.
Figure 22:
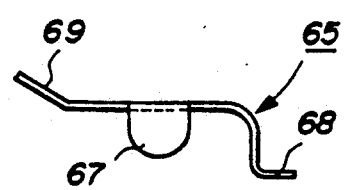

Reference numeral 61 represents a cable holder. This cable holder 61 is made of polyacetal in FIG. 4. As indicated in FIGS. 17 to 20, this cable holder 61 consists of a contact surface 62, which is made to contact with the side wall of the rotor 20, a mounting hole 63 formed approximately at the center of this contacting surface 62, a locking plate 64 disposed; extending from the upper surface thereof in the direction opposite to the contacting surface 62, with which a locking piece described later is engaged, and a mounting surface 66 for the cable guide 65 of FIGS. 21 and 22, which is formed on the opposite surface from the contacting surface 62. The cable clamp 65 is made of a stainless steel plate and it consists of a pair of bent mounting pieces 67 formed at the central portion by bending a pair of side portions, which are opposite to each other, a bent portion 68 formed in the form of a ledge and a bent portion 69 formed by bending a side portion at an angle to the main body of the cable guide opposite to the ledge 68 as shown in FIGS. 21 and 22, and a circular hole 70 formed correspondingly to the mounting hole 63 formed in the cable holder 61. An FPC described later is put between the mounting surface 66 of this cable holder 61 and the cable clamp 65 and one end portion of this FPC is bent around to the contacting surface 62 of the cable holder 61, which is put between the cable holder 61 and the rotor 20. Then one end portion of the FPC is secured to the rotor 20 by inserting a screw through the circular hole 70 and the mounting hole 63 and screwing into a threaded hole formed in a side surface of the rotor 20.

Figure 23:
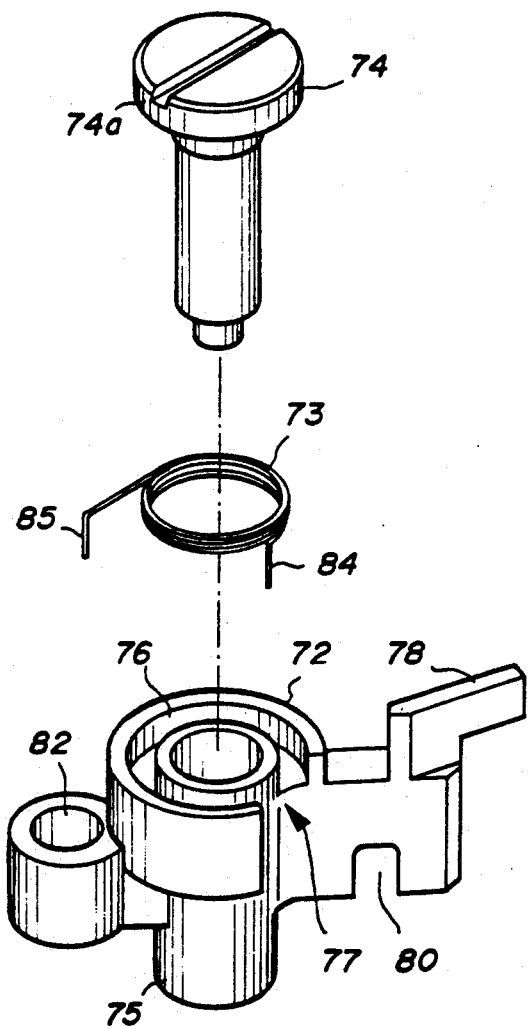
FIG. 23 is an exploded perspective view of a lock lever driving spring part.
Figure 24:
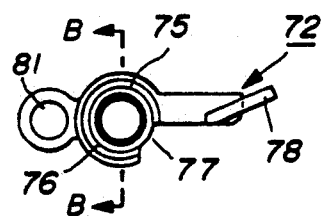
FIGS. 24 to 27 are a plan view, a front view, a bottom view and a cross-sectional view along a line B—B of the lock lever, respectively.
Figure 25:
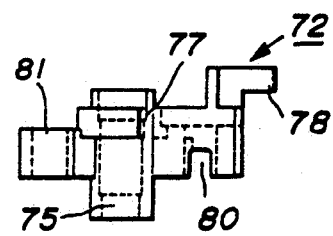
Figure 26:
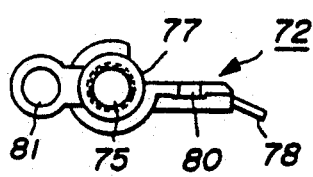
Figure 27:
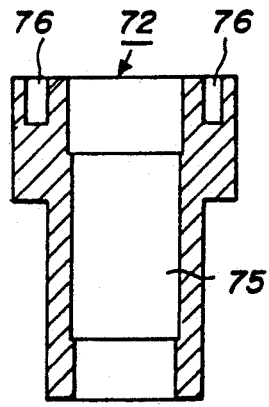
Figure 28:
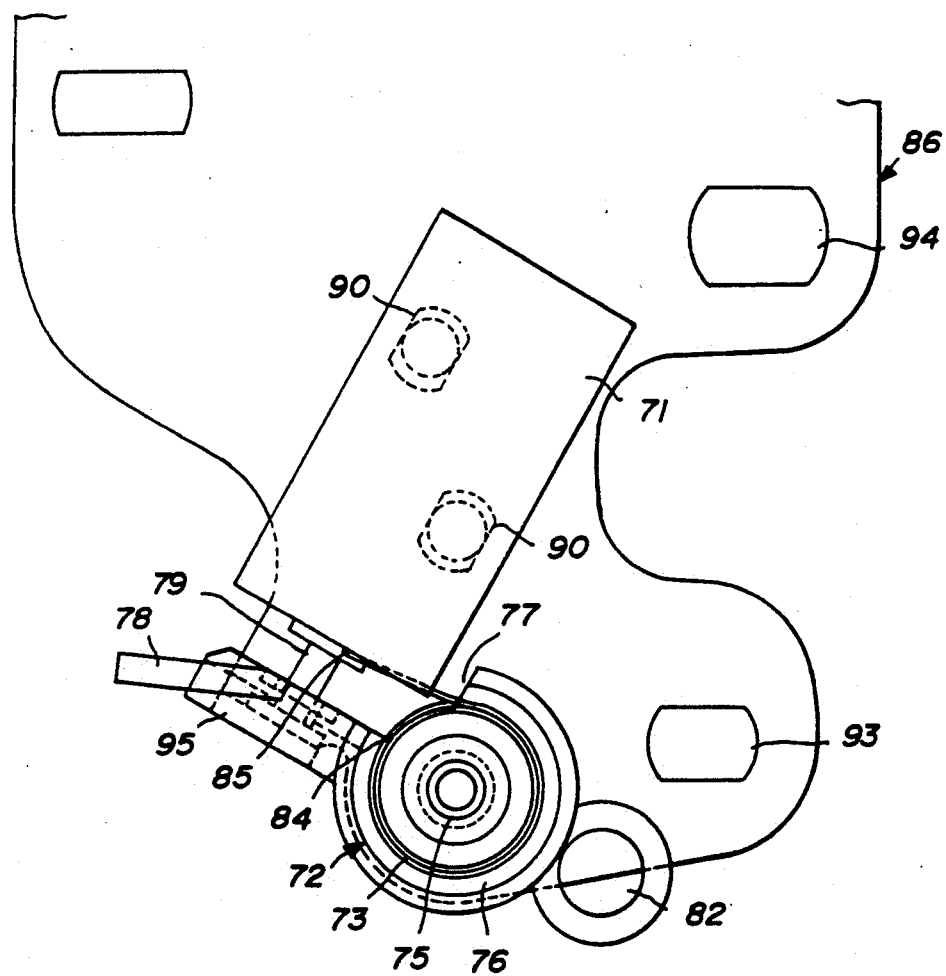
FIG. 28 is a plan view of the lock lever driving spring part.

The autoretract mechanism 5 shown in FIG. 1 consists principally of a solenoid, a locking lever 72 driven by this solenoid 71, and a spring 73 as indicated in FIG. 23. This locking lever 72 is made of, for example, polyacetal and as shown in FIGS. 24 to 27, consists of a bearing portion 75, through which a stud 74 is inserted, a ring-shaped recess portion 76 formed in a coaxial circular shape on the upper surface of this bearing portion 75, a cut-out portion 77 for exposing a spring, which portion is formed by cutting off a part of the ring-shaped recess portion 76, a locking piece 78 engaged with a locking plate 64 mounted on the rotor 20 described above, an engaging portion 80 for engaging a driving shaft 79 of the solenoid 71 referring to FIG. 28, formed by cutting off the lower end portion of this locking piece 78, and a mounting portion 82 for mounting a balancer 81 made of tungsten and disposed on the side, which is opposite to the locking piece 78, as indicated in FIGS. 24 to 27. The locking lever 72 is so constructed that it is balanced around the center of rotation owing to this balancer 81. In FIG. 23, a spring 73 is disposed in the ring-shaped recess portion 76 of this lock lever 72. The two end portions 84 and 85 of this spring 73 are bent downward. One of the ends 84 is engaged with the locking piece 78 and the other end is engaged with a protruding surface of a driving shaft, 79 of the solenoid 71. Since one end 84 of this spring 73 is engaged with the locking piece 78, as indicated in FIG. 28, and the other end 85, which is in the free state, is engaged with the solenoid 71 (position in the provisional mounting state); and further the solenoid 71 is positioned in the mounting state, the locking lever 72 is energized counterclockwise by the spring 73 and the driving shaft 79 of the solenoid 71 engaged with the engaging portion 80 of the locking lever 72, as indicated in FIG. 28, and is drawn-out by the non-energized solenoid 71. Further, the stud 74 is inserted through the bearing portion 75 of the locking lever 72 and the extremity of the stud 74 passing through an elongated hole 83 formed in the lower yoke plate 38 is screwed in the mounting threaded hole 88 (not shown) formed in the solenoid bracket 86. The lower end of this stud 74 is formed so as to have a smaller diameter, as indicated in FIG. 23, so that the height of the stud 74 at screwing is regulated and that there exist gaps at the upper and the lower extremity of the locking lever 72. In this way, the locking lever 72 is rotatable around the stud 74. The ring-shaped recess portion 76 is covered by the head portion 74a of the stud 74 so that the spring 73 of the ring-shaped recess portion 76 is secured therein.

Figure 30:
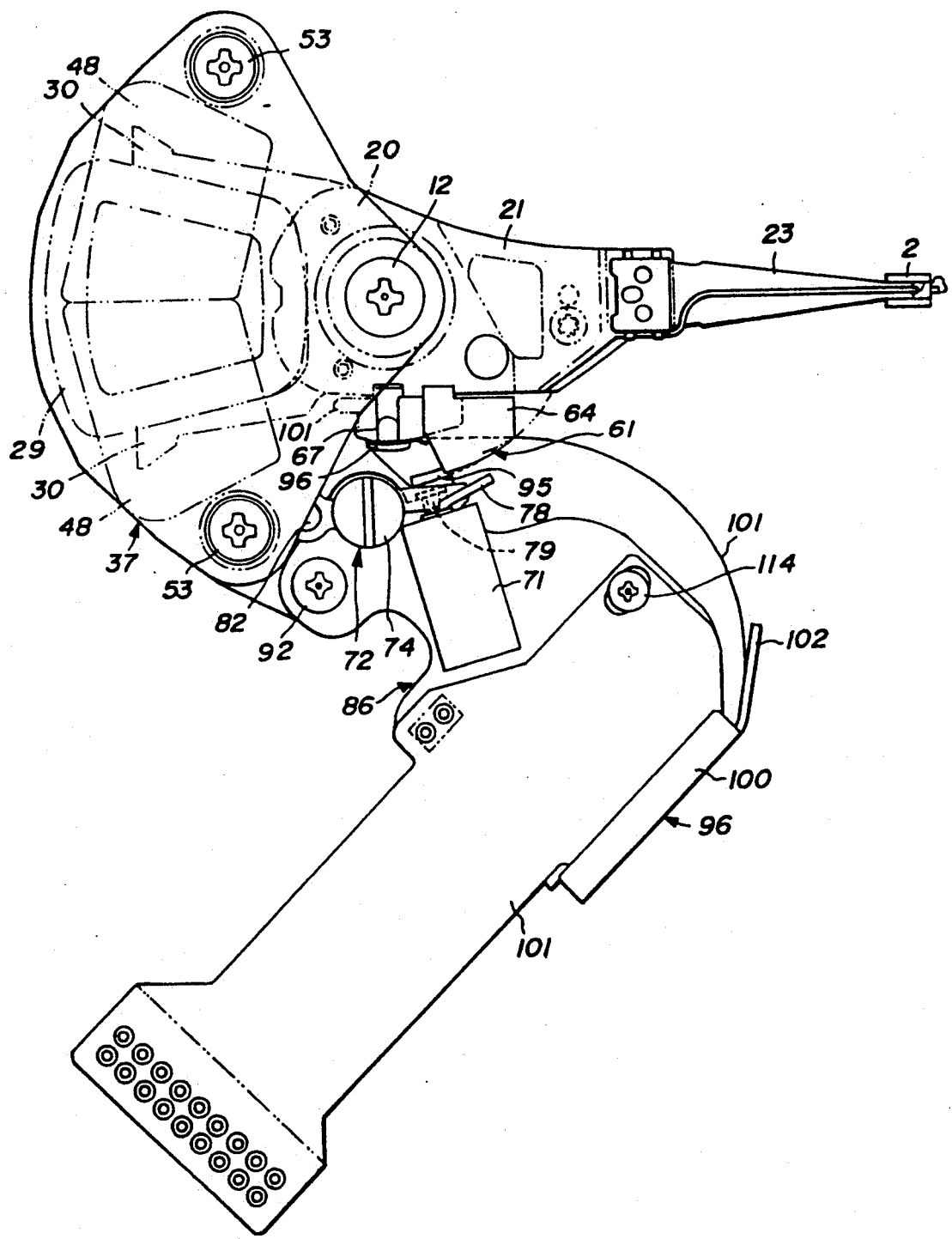
FIG. 30 is a plan view of the actuator unit.
Figure 32:
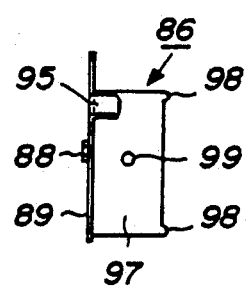
FIGS. 32 and 33 are a side view and a plan view of a solenoid bracket, respectively.
Figure 33:
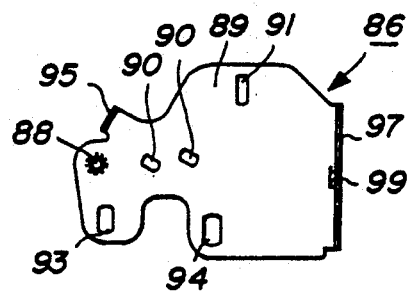
Figure 34:
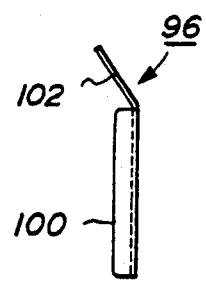
FIGS. 34 and 35 are a front view and a side view of a cable guide, respectively.
Figure 35:
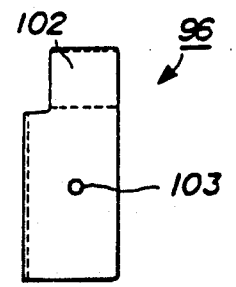
Figure 36:
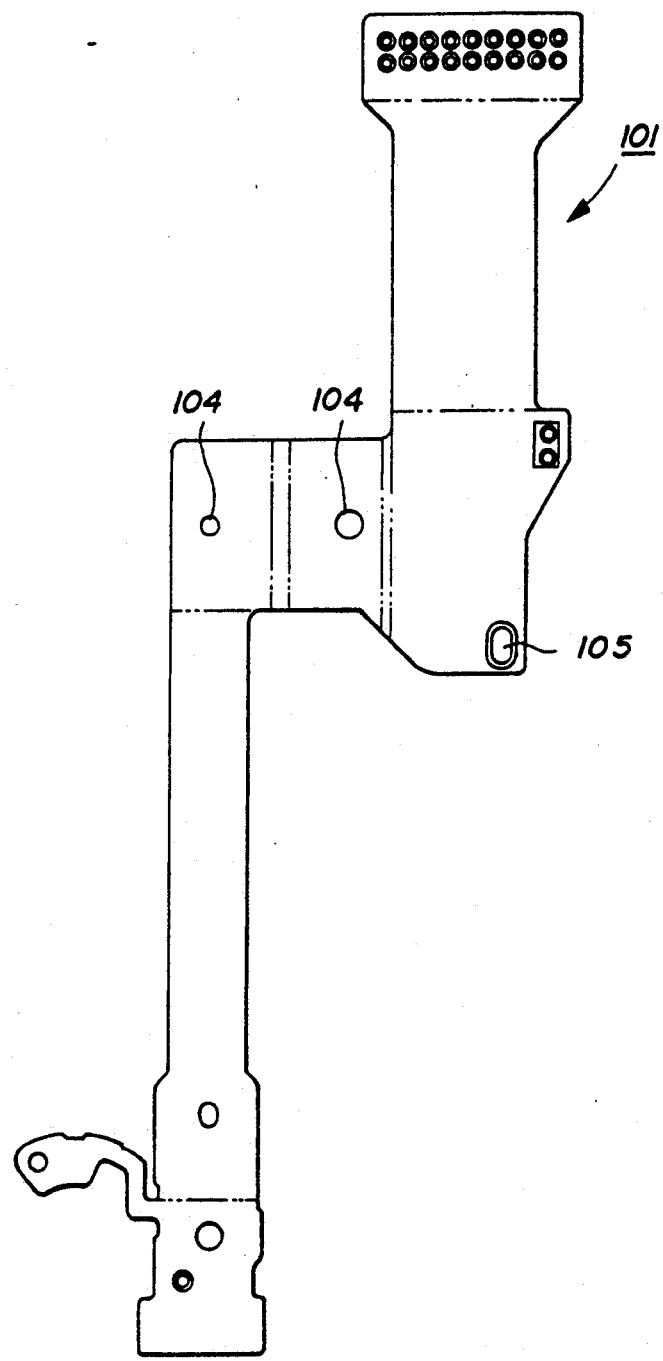
FIG. 36 is a plan view of the FPC.

The solenoid bracket 86 is made of an aluminum plate. It has a bottom plate 89 as indicated in FIGS. 32 and 33, and in this bottom plate 89, there are formed the through hole 88 described above, solenoid mounting holes 90, a hole 91 for mounting on the base plate 6, a hole 93 for securing a screw 92 passing through the lower yoke plate 38, a spill port 94 for the FPC connector terminal of the solenoid, etc. Further, a stopping piece 95 for restricting the region of movement of the locking piece 78 of the locking lever 72 is formed on the bottom plate 89 by bending a part thereof. A mounting piece 97 for mounting a cable guide 96 is formed on the bottom plate 89 by bending a part thereof. Protrusions 98 are disposed at the upper end of this mounting piece 97 as indicated in FIG. 33. A threaded portion 99 is formed at the nearly central portion of the mounting piece 97. The cable guide 96 is formed in a rectangular plate as indicated in FIGS. 34 and 35, and on the upper edge thereof there is formed a bent piece 100 by bending a part of the plate. Further a piece 102 regulating the back tension of a flexible print board (FPC) is formed at one edge by bending it. This back tension regulating piece 102 regulates the back tension of the FPC 101 of FIG. 36 caused by the actuator. The leading angle of the FPC 101 can be varied by varying the bending angle of the back tension regulating piece 102 with respect to the FPC 101, which is in contact with the inner side of the back tension regulating piece 102 as indicated in FIG. 30. In this way, since the bending of the FPC 101 can be varied, the back tension of the FPC 101 can be adjusted. Consequently, the back tension is eliminated so as to be 0 by bending the back tension regulating piece 102 opposite to the direction, in which the back tension is applied by the actuator. A small hole 103 is formed in the back tension regulating piece 102, corresponding to the threaded portion 99 formed in the mounting piece 97 stated above. The FPC 101 is put between the mounting piece 97 and the back tension regulating piece 102 and secured there by means of screws. Further, since a part of the flexible print board 101 is covered by the back tension regulating piece 102, the latter has a shielding action against external noise and thus self cross-talk can be prevented. Holes 104, through which screws are inserted, and a mounting hole 105, are formed in this FPC 101 as indicated in FIG. 36.

Figure 37:
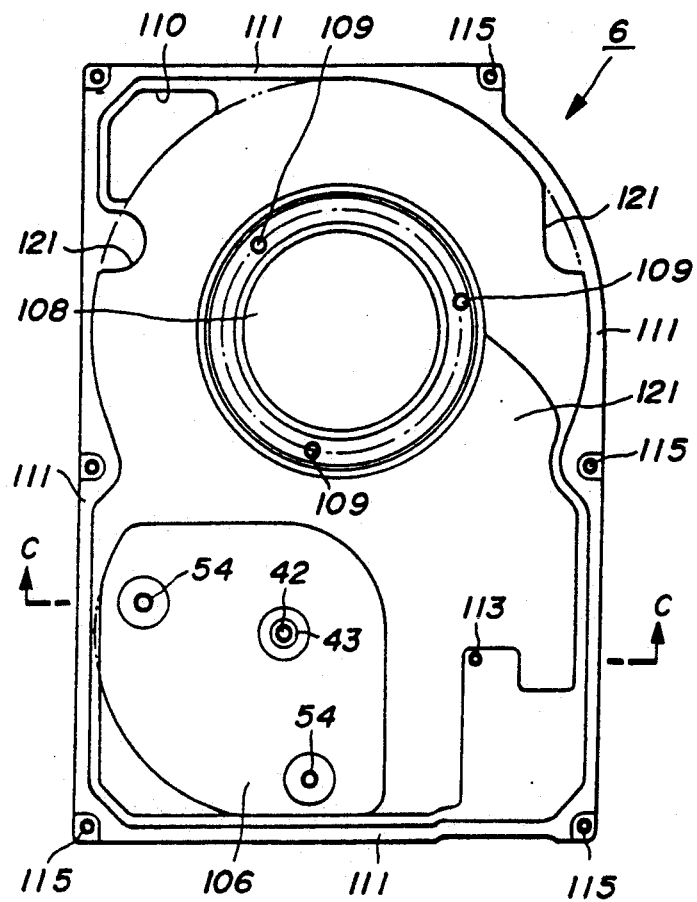
FIG. 37 and 38 are a plan view and a cross-sectional view along a line C—C of the base plate, respectively.
Figure 38:
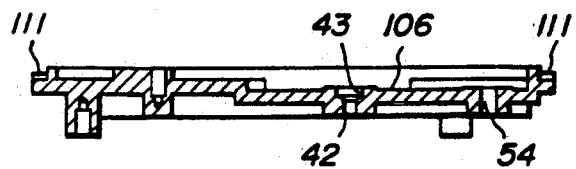

The base plate 6 is formed in an approximately rectangular plate shape by aluminum die casting. As indicated in FIGS. 37 and 38, there is disposed a pie-shaped stepwise recess portion 106 on the upper surface of the base plate 6 as shown in FIGS. 37 and 38. The lower yoke plate 38 constituting the actuator drive mechanism 4 is located in this stepwise recess portion 106. At the same time, the screw 42 stated above is screwed in the stepwise recess portion 106 and the mounting screw 12 and a screw 53 are screwed in threaded holes 54. Further, a circular hole 108, wherein the spindle motor 3 is mounted, is formed in the base plate 6 and threaded holes 109 for motor mounting screws, are formed in the periphery of this circular hole 108. In addition, there is disposed an approximately triangular recess portion 110 for mounting the air filter described later at a corner on the upper surface of the base plate 6. A ledge portion 111 is formed at the edge portion on the upper surface of the base plate 6 and a gasket 112 not shown is disposed in this ledge portion 111. Reference numeral 113 is a threaded hole disposed on the base plate 6. A screw 114 is screwed in this threaded portion 113 through a hole 9 for mounting the solenoid bracket 86 and a hole 105 for mounting the FPC 101. Reference numeral 115 indicates threaded holes formed in the ledge portion 111 of the base plate 6 and fixing screws 116 for fixing the top cover 7 are screwed in these threaded holes 115.

The clamping portion of the magnetic disk 1 is disposed on the upper extremity of the driving shaft of the spindle motor 3 as shown in FIG. 2. This clamping portion is so constructed that the driving shaft is inserted in two magnetic disks 1 putting a spacer therebetween and further a fixed plate 118 is disposed over the upper magnetic disk 1 and that a fixing screw 119 not shown is inserted through this fixing plate 118 and screwed in the threaded portion 120 formed in the upper end surface of the driving shaft. Still further cut-off portions 121 are formed in the base plate 6 so that no fingers contact the magnetic disk 1 at the clamping.

Figure 39:
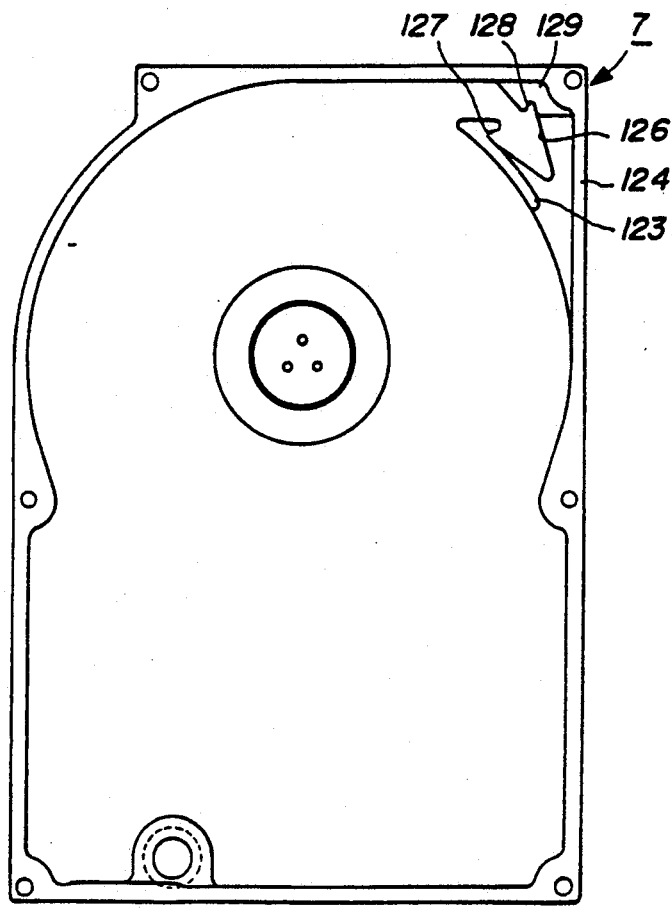
FIG. 39 is a bottom view of a top cover.
Figure 40:
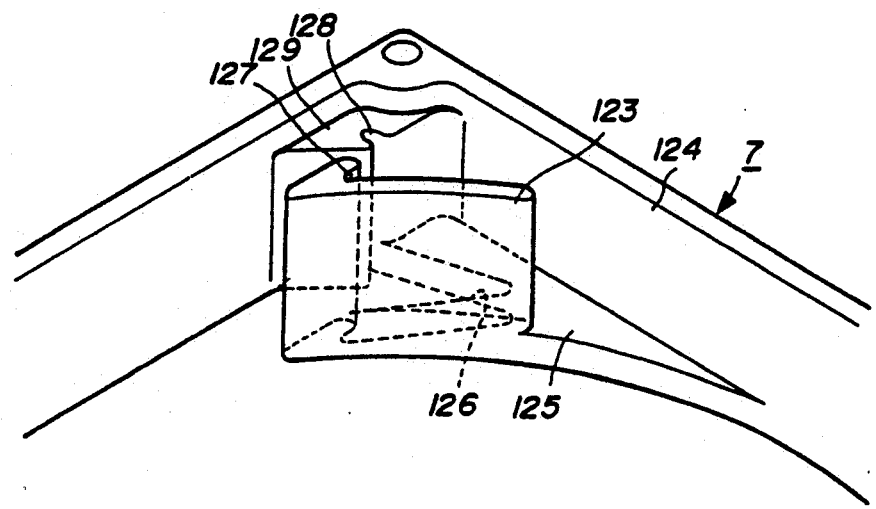
FIG. 40 is an enlarged perspective view of the air filter receiving part of the top cover.

The top cover 7 is formed in a rectangular parallelepiped, whose lower side is opened, by aluminum die casting and as indicated in FIGS. 39 and 40, the lower end surface of the top cover 7 is located on the ledge portion 111 of the base plate 6 through the gasket 112 described above. Consequently, the parts described above disposed on the base plate 6 are enclosed in a space formed by the base plate 6 and the top cover 7 so that no dust can penetrates therein. Further, the air filter 122 of FIG. 41 is located in this space.

Figure 41:
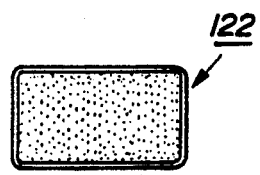
FIG. 41 is a front view of the air filter.
Figure 42:
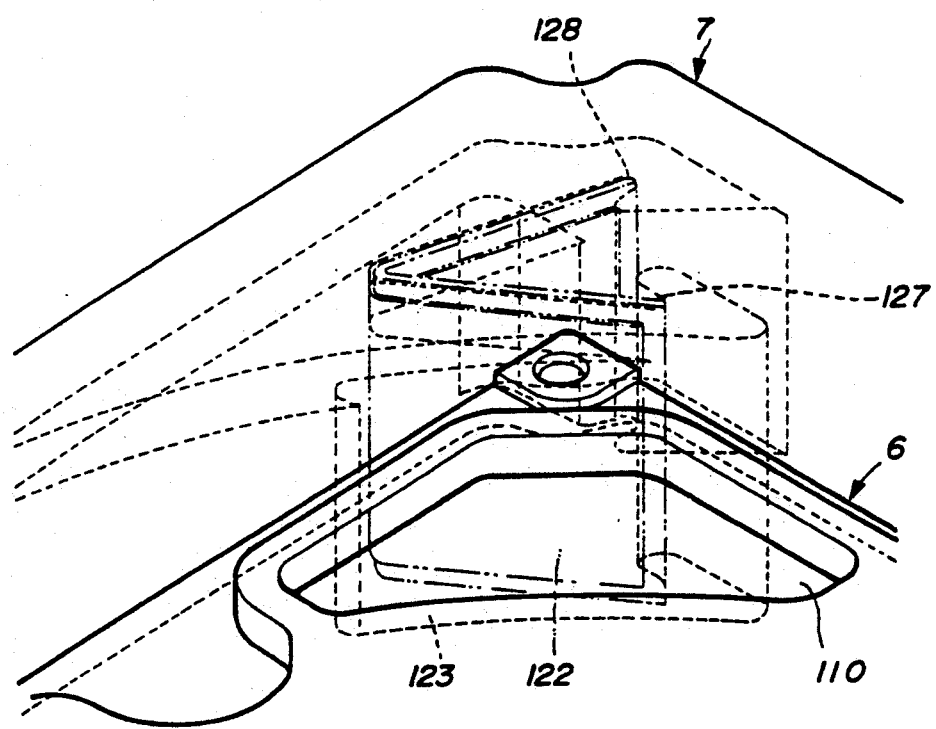
FIG. 42 is a perspective view of the air filter part.
Figure 43:
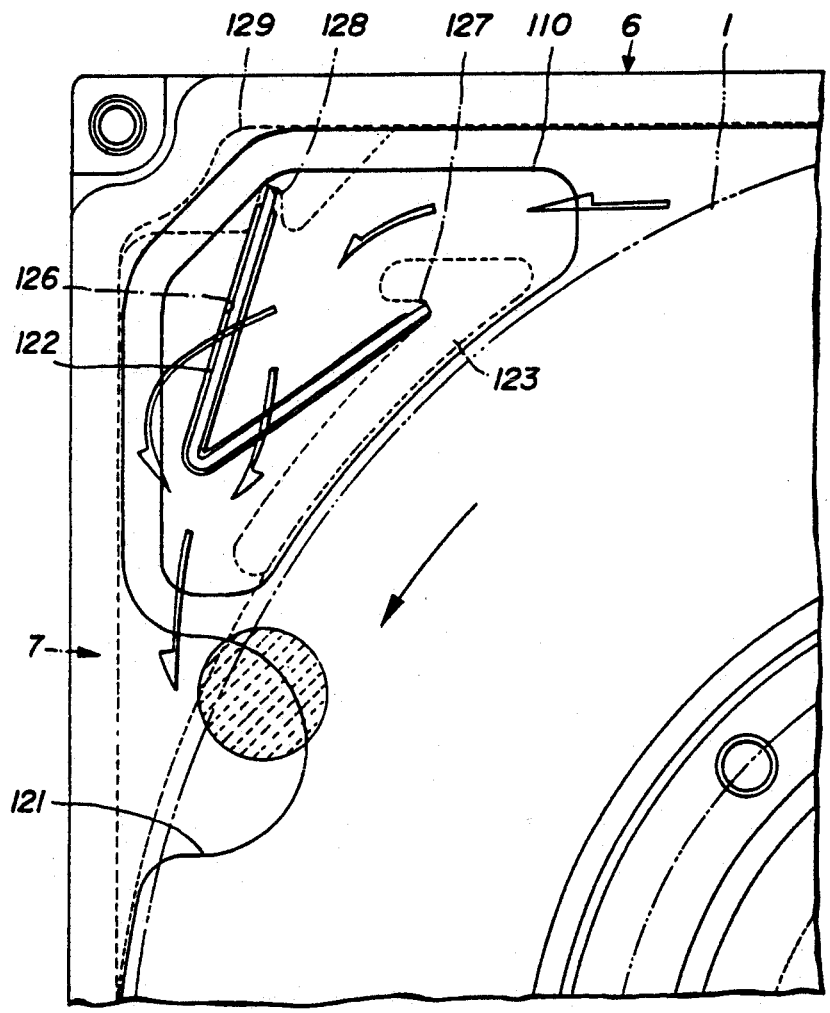
FIG. 43 is a plan view of the main part of the air filter.
Figure 44:
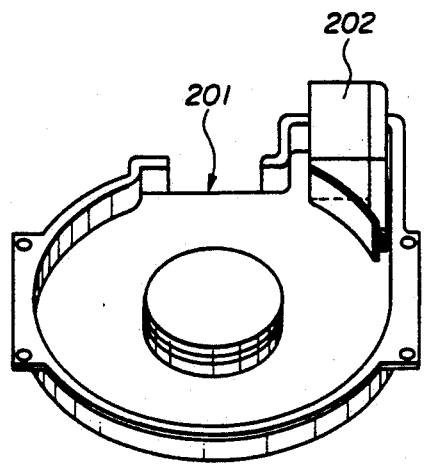
FIG. 44 is a perspective view showing an arrangement where the air filter is secured to the base plate of a conventional disk drive device.
Figure 45:
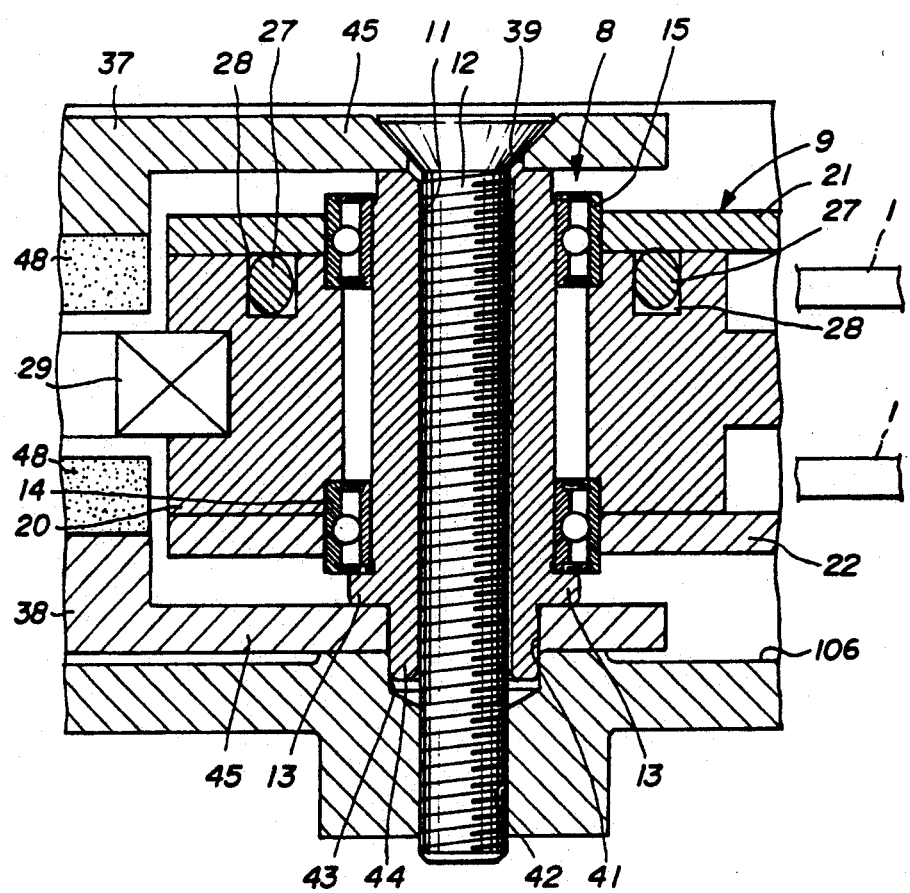
FIG. 45 is a longitudinal cross-sectional view of the bearing part of a conventional actuator.
Figure 46:
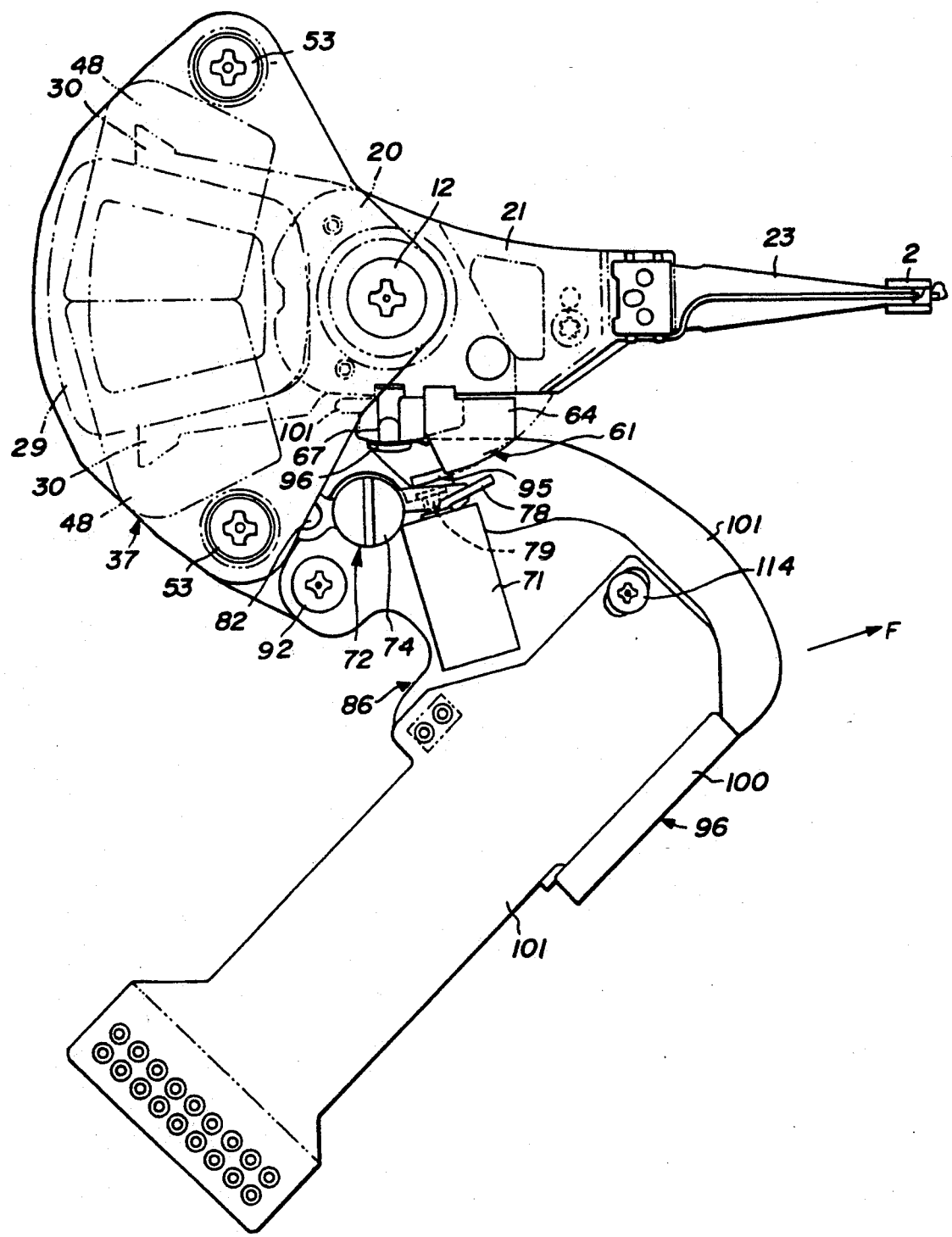
FIG. 46 is a plan view of the conventional actuator.

This air filter 122 is formed in a rectangular plate by laminating filtering material made of polypropylene with a polyester film as indicated in FIG. 41. This air filter 122 is flexible and twice-folded along the center line so as to be V-shaped. Then it is located in a receiving portion of the top cover 7. As indicated in FIGS. 42 and 43, this receiving portion is disposed on the inner surface of the top cover 7, corresponding to the recess portion 110 of the base plate 6. Further an air stream path is formed in this top cover 7 by disposing a negative pressure generating fin 123 along the outer periphery of the magnetic disk 1. Grooves 127 and 128 are disposed on the rear side of one end of the negative pressure generating fin 123 forming this air stream path and a protrusion 129 of the side plate 124. At the same time, a V-shaped holding portion 126 is disposed at the bottom of the air stream path and a recess portion 110 is formed at the position of the base plate 6 corresponding to this holding portion 126. The two ends of the air filter 121 folded in a V-shape are inserted in the grooves 127 and 128 and at the same time the two side extremities are inserted in the holding portion 126 and the recess portion 110. Since the air filter 121 is received in this state, the air filter 121 can be directly mounted on the top cover 7 and the base plate 6 without any mold case, which has been required according to the prior art techniques. Consequently, the number of parts can be reduced and the mounting operation can be simplified. In addition, the air filter 121 will not loosen or detach during use and thus will not damage the magnetic disk 1. Further, since no mold case is required, the area of the air filter 121 can be utilized efficiently, which improves the filter efficiency.

Now, the operation of the autoretract mechanism 5 will be explained.

Figure 29:
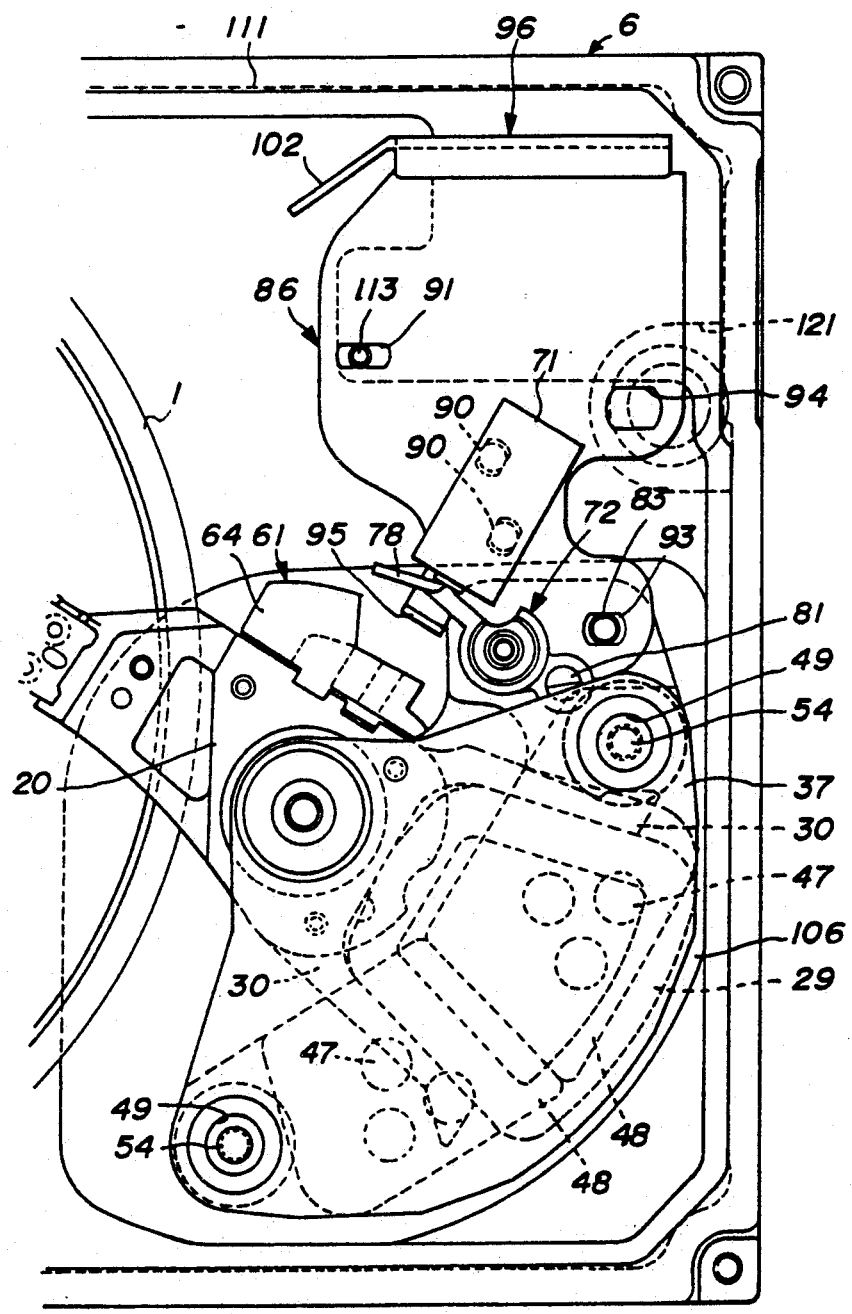
FIG. 29 is an enlarged plan view in the neighborhood of the actuator.

When the disk drive device is switched-on, current flows from the control section not indicated in the figures to the solenoid 71 to pull-in the driving shaft 79 referring to FIG. 28. Consequently, the locking piece 78 of the locking layer 72 coupled with the driving shaft 79 is pulled-in by this driving shaft 79 against the elastic force of the spring 83 and the locking lever 72 is rotated clockwise in FIG. 29 around the stud 74. By this rotating operation, the locking piece 78 is positioned outside of the region of movement of the locking plate 64 by the seek of the actuator and the actuator is rotated by the voice coil motor so that the magnetic head 2 can be moved over the magnetic disk 1.

On the other hand, when the disk drive device is switched-off, counter electromotive force is generated in the spindle motor and the swing arm 9 makes the magnetic head 2 seek towards the inner periphery of the magnetic disk 1 by this counter electromotive force. At the same time, since the current flow through the solenoid is stopped, the lock lever 72 is rotated counterclockwise around the pin 74 by the energy stored in the spring 73 and the locking piece 78 as well as the extremity of the driving shaft 79 are made to contact the stopper piece 95 of the solenoid bracket 86 to be stopped there. At this position, since the extremity of the locking piece 78 is engaged with the locking plate 64 of the actuator, the actuator is locked at the innermost periphery portion of the magnetic disk 1. According to the autoretract mechanism described above, since the spring 73 is biased at the state, where the spring 73 is mounted on the ring-shaped recess portion 76, (provisional mounting state), bending degree of the protruding end up to the position in the mounting state is small. Therefore the mounting is terminated, when the solenoid 71 is slid and fixed by screwing, and thus the mounting is easy. Further, since the spring 73 is located in the ringshaped recess portion 76, the spring 73 is incorporated in the bearing portion 7. Consequently, the spring 73 can be located in a small space and it is possible to form the device in a compact form. Further, since the opening of the ring-shaped recess portion 76 is covered by the head portion of the stud 74, it is not anticipated that the spring 73 located in the ring-shaped recess portion 76 will break out therefrom. Also, since the stud 74 is constructed so as to be fixed by screwing, the mounting and dismounting of the stud 74 is simple and the maintenance is easy.

In addition, since a weight balancer 81 having the same rotational inertia as the mass of the driving shaft 79 of the solenoid 71 is inserted in the lock lever 72 under pressure to be mounted there, the rotating operation of the locking lever 72 is stable. Since the locking lever 72 and the locking plate 65 are made of polyacetal resin, no lubricant such as grease is necessary for the locking piece 78, which produces slight shavings.

Since the solenoid bracket 86 is so constructed that the position can be changed more or less with respect to the lower yoke plate 38, the play at the autoretract of the actuator, i.e. undue rotational freedom when the locking piece 78 is engaged with the locking plate 65, can be reduced as much as possible.

Next the mounting direction of the actuator drive mechanism 4 and the autoretract mechanism 5 will be explained.

Figure 31:
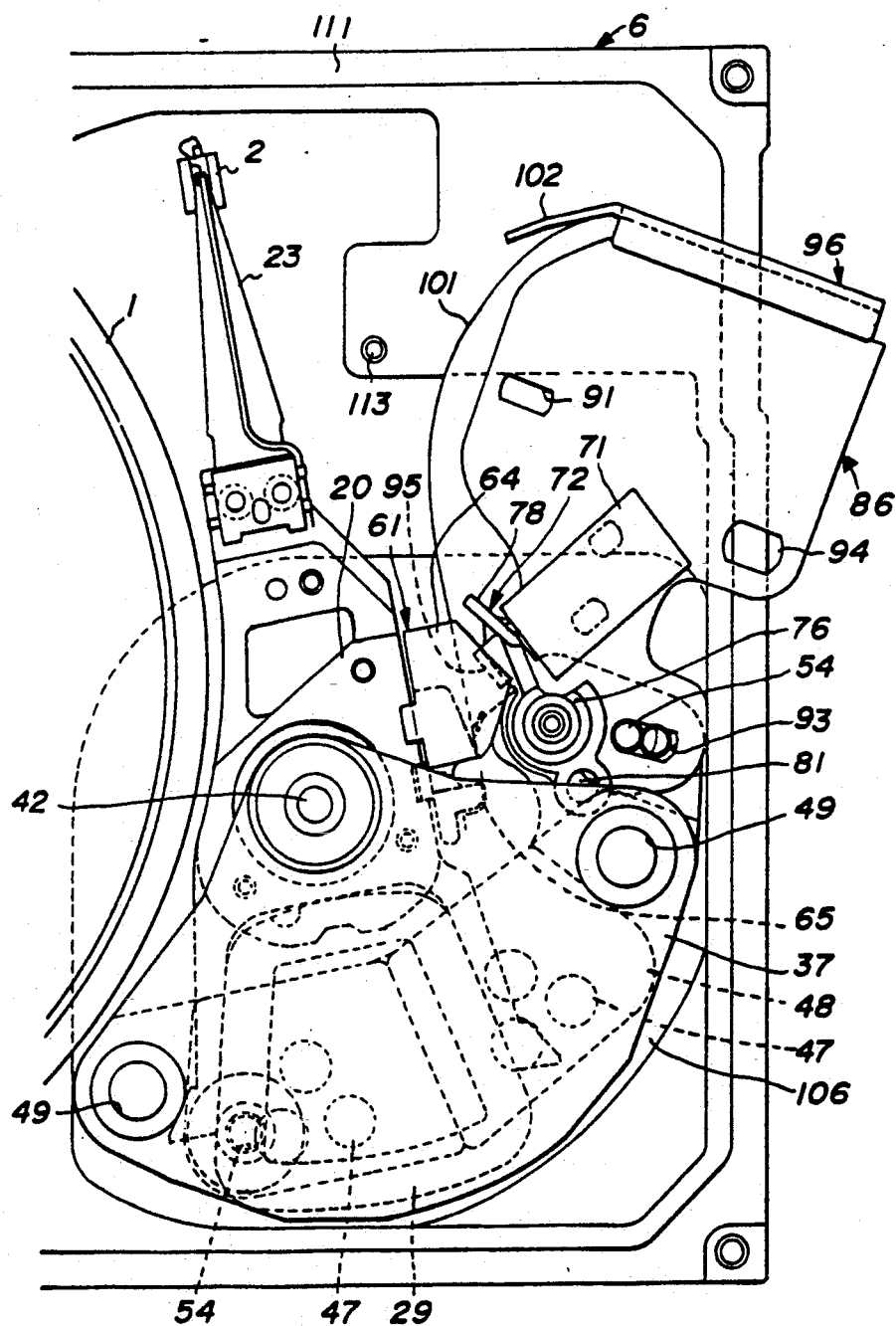
FIG. 31 is an enlarged plan view illustrating the state before mounting the actuator unit.

As indicated in FIG. 30, the voice coil motor portion consisting of the moving coil 29, the permanent magnets 48, the swing arm 9, the autoretract mechanism 5, the fixed part of the FPC 101 and the head amplifier are constructed in one body, i.e. assembled as one unit. Consequently, the parts, for which the function and the performance of various elements, which are assembled in one unit, can be mounted in the base plate 6. At the mounting of this unit, at first at the lower end portion 44 of the protrusion 8 protruding from the lower surface of the lower yoke plate 38 is engaged with the circular recess portion 43 formed in the base plate 6 so as to position the center of rotation of the actuator (refer to FIG. 31 and FIG. 5). In this state, the insertion hole 52 of the fixed shaft 50 of FIG. 14 is separated from the threaded hole 54 formed in the base plate 6. When the actuator is rotated counterclockwise from this state, the magnetic head 2 on the actuator is displaced towards the inner periphery of the magnetic disk 1. Then the outer extremity of the supporting arm 30 on the rotor 20 of the actuator is in contact with one of the fixed shafts 50 and the upper yoke plate 37 as well as the lower yoke plate 38 are rotated counterclockwise around the lower end portion 44 stated above. Then, at the mechanical stop position (the disk and the magnetic head are in contact with each other in a non-read/write area of the innermost peripheral side of the disk) of the magnetic head 2, the insertion hole 52 for the fixed shaft 50 and the threaded hole 54 formed in the base plate 6 are made approximately in alignment with each other and the fixed shafts 50 are secured to the base plate 6 by means of screws 53. At this mounting, the swing arm 9 is over-rotated with respect to the center line of the domain of rotation thereof. For this reason, a stopper (side wall of the recess portion 106) is disposed on the base plate 6 so that the swing arm 9 is not over-rotated and that the magnetic disk 1 is not disturbed at the mounting of the unit. Further, since there is disposed a clearance for the fixed shaft 50 in the radial direction of the screw 53, the regulation of the relative position of the magnetic head 2 to the magnetic disk 1, i.e. regulation for positioning the magnetic head 2 at the tolerable outermost periphery of the magnetic disk 1, is possible.

The solenoid bracket 86 is secured by the mounting threaded hole 88 by means of the stud 74 by screwing. This stud 74 passes through the bearing portion 75 of the locking lever 72 and the elongated hole 83 of the lower yoke plate 38, and is screwed in the mounting threaded hole 88. Further, the spring 73 is located in the ring-shaped groove 76 formed in the bearing portion 75 and the two ends of the spring 3 are engaged with the two edges of the cut-out portion 77. This engagement is effected by varying the position of the protruding end of the spring 73 in the free state, as indicated in FIG. 28, against the elastic force of the spring 73. This state is the provisional mounting state of the spring 3. The protruding end of the spring 73 is engaged with the protruding surface of the driving shaft 79 of the solenoid 71 mounted on the solenoid bracket 86 so as to energize the spring 73. The driving shaft 79 is mounted so that the extremity thereof is engaged with the locking piece 78 of the locking lever 72. Consequently, the energy stored in the spring 73 acts on the locking lever 72 so as to rotate it counterclockwise around the stud 74 so that the extremities of the locking piece 78 and the driving shaft 79 are made in contact with the stopping piece 95 of the solenoid bracket 86. Since the solenoid bracket 86 is rotatable around the stud 74 with respect to the lower yoke plate 38, the angular regulation can be varied with respect to the lower yoke plate 38 mounted on the base plate 6 as indicated above. That is, when the solenoid bracket 86 is rotated around the stud 74, the locking piece 78 of the locking lever 72 is also rotated around the stud 74. By this rotation, since the locking piece 78 can be located within the region of movement of the locking plate 64 of the actuator, the solenoid bracket 86 is secured to the base plate 6 and the lower yoke plate 38 by means of the stud 74 and the screw 92 by screwing, after having been rotated to where the locking piece 78 is within the region of movement of the locking plate 64 such that it will be out of the region of movement when the solenoid 71 is energized to pull-in the driving shaft 79.

Furthermore, since each of the mechanisms is made in the form of a unit, the function, the performance, i.e. the latching function, the linearity, the torque, etc. can be regulated for every mechanism, and they can be mounted on the base plate 6 as a functioning unit already calibrated, which simplifies the adjustment after the mounting.

As explained above, according to the present invention, it is possible to easily mount the actuator without disturbing the disk at mounting, and at the same time, since each of the mechanisms constituting the actuator is made in the form of a unit, the mounting operation is easy and it is possible to make the disk drive in a compact form by mounting the actuator unit on the base plate after having calibrated every mechanism. Further, since the stopper conditions can be varied on the outer periphery side and on the inner periphery side of the stopper body by a simple construction, the area of the disk can be utilized efficiently. In addition, it is possible to improve the close adhesion between the yoke plate and the permanent magnet by increasing the strength of the adhesion, which makes it possible to standardize the form and the size of the permanent magnet. Also, since the magnetic flux density can be made approximately uniform within the region of movement of the moving coil, the displacement operation is stabilized. Since the pivot bearing can be unified, the mounting of the rotor of the actuator on the pivot bearing and the replacement work are simple. Therefore, the rotor is not impaired and the positional precision with respect to the housing is improved.

What is claimed is:

1. A disk drive device comprising:
    a pivot bearing portion comprising:
        antifriction bearings, each with an outer wheel and an inner wheel; and
        an outer holder with an outer peripheral surface including a flange portion, said outer holder including an engaging portion with which the outer wheel of the bearings is engaged; and
    a swing arm supported by the pivot bearing portion, said swing arm comprising:
        a rotor; and
        a head arm positioned on and aligned with the rotor, the head arm being formed with a hole having cut off portions formed on its outer edge, wherein the size of the hole is such as to allow the flange portion to pass through and be in contact with the rotor; and
    wherein the rotor is mounted on the flange portion by screws passing through the cut off portions and being secured in the rotor, and by the screw heads holding the flange portion and the head arm against the rotor.

2. A disk drive device according to claim 1 further comprising:
    a housing with a recess portion, said recess portion having a threaded hole;
    wherein said pivot bearing portion further comprises an inner holder with a lower end portion, the bearings being engaged with the inner holder;
    wherein the lower end portion is engaged with the recess portion and the pivot bearing portion is mounted to the housing by a screw secured in the threaded hole of the recess portion.

* * * * *